United States Patent [19]

Maeda et al.

[11] Patent Number: 5,556,059
[45] Date of Patent: Sep. 17, 1996

[54] DEVICE FOR GUIDING WIRE HARNESS OF STEERING COLUMN

[75] Inventors: Yuji Maeda; Seiji Ito; Chiaki Chida, all of Shizuoka-ken, Japan

[73] Assignee: Yazaki Corporation, Tokyo, Japan

[21] Appl. No.: 266,556

[22] Filed: Jun. 28, 1994

[30] Foreign Application Priority Data

Jun. 28, 1993 [JP] Japan .................................. 5-157569
Dec. 15, 1993 [JP] Japan .................................. 5-315423

[51] Int. Cl.⁶ ...................................................... F16L 3/00
[52] U.S. Cl. .............................. 248/49; 174/69; 174/72 A
[58] Field of Search .................................. 248/49, 56, 65, 248/68.1, 70, 74.2, 74.4, 73; 174/135, 72 A, 69, DIG. 9; 280/775; 200/61.54; 191/12 R; 439/15, 32, 33, 34

[56] References Cited

U.S. PATENT DOCUMENTS 3,300,572  1/1967  Dahlgreen et al. ................... 174/69
3,792,189  2/1974  Stengel et al. ............... 174/DIG. 9 X
4,992,629  2/1991  Morais ..................................... 174/69
5,003,129  3/1991  Toyomasu et al. ............... 174/72 A X
5,106,040  4/1992  Cafmeyer et al. ....................... 248/73
5,149,017  9/1992  McEntire et al. ..................... 248/49 X

FOREIGN PATENT DOCUMENTS 63-325275  2/1988  Japan .
3-7639     1/1991  Japan .

*Primary Examiner*—Ramon O. Ramirez
*Attorney, Agent, or Firm*—Wigman, Cohen, Leitner & Myers, P.C.

[57] ABSTRACT

A device for guiding a wire harness connected to a steering column, includes a protector for accomodating a slacken part of the wire harness therein and two half cylindrical ribs elastically formed in the protector. In operation, when the slacken part is expanded, the ribs serve to urge the slacken part to recover the original configuration before being expanded.

22 Claims, 18 Drawing Sheets

DEVICE FOR GUIDING WIRE HARNESS OF STEERING COLUMN

BACKGROUND OF THE INVENTION

1. Field of the Invention

This invention relates to a device for guiding a wire harness of a steering column having a tilt function and a telescopic function.

2. Description of the Related Art

In the wire harness installed in this kind of steering column, in order to respond to operations of a tilting mechanism and a telescopic mechanism of the steering column, it is necessary that the wire harness is so constructed as to absorb its expansion and contraction derived from the respective operations of mechanisms.

In Japanese Unexamined Utility Model Publication (Kokai) No.63-32527, there is disclosed a device to absorb the expansion and contraction of wire harness.

This device is provided under a steering column with a harness pool to accommodate the middle part of the wire harness so as to be a loop, whereby it is possible to shrink or enlarge a diameter of the loop by a telescopic action of the steering column. Arranged in the harness pool is a boss which comes into contact with the harness loop from an inside thereof. The loop is adapted so as to be shrunk and enlarged as a base point of its contact with the boss.

Further, in Japanese Unexamined Patent Publication (Kokai) No.3-7639, there is also disclosed another device to have the same functions as mentioned above.

In this device, a protector for accommodating the wire harness comprises two members which engage with each other. By the arrangement, the protector can deform easily in the longitudinal direction thereof. The members are provided with harness guards to divide the wire harness W therein into two harness parts, in a direction of width thereof. In operation, since the harnessguides can deform along the width direction of the wire harness, accommodating the divided wire harness therein, it is possible to absorb the expansion and contraction of wire harness itself.

However, the former device has a shortcoming such that, since the harness loop is adapted so as to be shrunk and enlarged as a base point of its contact with the boss, a stress is produced at the contact, particularly, when the loop is shrunk.

On the other hand, the latter divice has also a shortcoming such that, since the protector is formed to be bifurcated, the device itself is apt to be large-sized. In addition, in the device, there is a possibility that the forked harness parts are idle in the protector thereby to make a noise.

SUMMARY OF THE INVENTION

It is an object of the present invention to provide a device for guiding a wire harness in a steering column, which is compact and capable of reducing a stress produced by its expansion under tension and contraction when untensioned while preventing noise from being generating.

In order to achieve the above-mentioned object, the present invention provides a device for guiding a wire harness connected to a steering column, comprising a protector for accommodating a part of the wire harness therein to protect the part from an outside thereof, the part being provided with a slacken or reserve part; and urging means for urging the slacken part to return an original configuration thereof when the slacken or reserve part is expanded.

In the present invention, the urging means are provided in the protector. Preferably, the protecting member comprises an outer protecting member and an inner protecting member constructed to be inserted into the outer protecting member and one side of the slacken, or reserve part is connected with the outer protecting member and the other side of the slacken part is connected with the inner protecting member and the urging means have one end connected with the outer protecting member and the other end connected with the inner protecting member thereby to connect the outer protecting member with the inner protecting member.

Alternatively, it is preferable that the urging means have one end to which one side of the slacken part is connected and which is engaged with the protector, and the other end to which the other side of the slacken part is connected and which is slidably engaged with the protector.

In the present invention, the urging means may comprise two half cylindrical ribs, a plural of flexible ribs or an elastic plate member. Alternatively, the slacken part may have a nature to return a spiral object of a constant diameter in a free state and the urging means may comprise the slacken part.

These and other objects and features of the present invention will become more fully apparent from the following description and appended claims taken in conjunction with the accompanying drawings.

BRIEF DESCRIPTION OF THE DRAWING

FIGS. 1A and 1B show a wire harness guide device according to a first embodiment of the present invention, in which FIG. 1A is a perspective view thereof when a wire harness is contracted and FIG. 1B is a perspective view thereof when the wire harness is expanded;

FIGS. 8A and 8B show the operations of the device according to the third embodiment, in which FIG. 8A is a side view thereof when a wire harness is contracted and FIG. 8B is a side view thereof when the wire harness is expanded;

FIGS. 10A and 10B show the operations of the device according to the fourth embodiment, in which FIG. 10A is a plan view thereof when a wire harness is expanded and FIG. 10B is a side view thereof when the wire harness is also expanded;

FIGS. 11A and 11B show the operations of the device according to the fourth embodiment, in which FIG. 11A is a plan view thereof when the wire harness is contracted and FIG. 11B is a side view of FIG. 11A;

FIGS. 13A and 13B show the operations of the device according to the fifth embodiment, in which FIG. 13A is a side view thereof when a wire harness accommodated therein is expanded and FIG. 13B is a side view thereof when the wire harness is contracted;

FIGS. 15A and 15B show the operations of the device according to the sixth embodiment, in which FIG. 15A is a side view thereof when a wire harness accommodated therein is expanded and FIG. 15B is a side view thereof when the wire harness is contracted;

FIGS. 17A and 17B show the operations of the device according to the seventh embodiment, in which FIG. 17A is a side view thereof when a wire harness accommodated therein is expanded and FIG. 17B is a side view thereof when the wire harness is contracted;

FIGS. 21A and 21B show the operations of the device according to the eighth embodiment, in which FIG. 21A is a perspective view thereof when a wire harness accommodated therein is expanded and FIG. 21B is a perspective view thereof when the wire harness is contracted.

DESCRIPTION OF THE PREFERRED EMBODIMENT

The first embodiment of the present invention is now described with reference to FIGS. 1A, 1B and 2.

The guide divide in accordance with the embodiment includes a rectangular and low box-shaped protector 11 (casing). The protector 11 comprises a box-shaped body 12 and a flat plate-like lid 13 which are mutually locked to each other. The body 12 has guide holes 14 and 15 for a wire harness W formed on both side faces thereof, respectively.

Figure 1B:
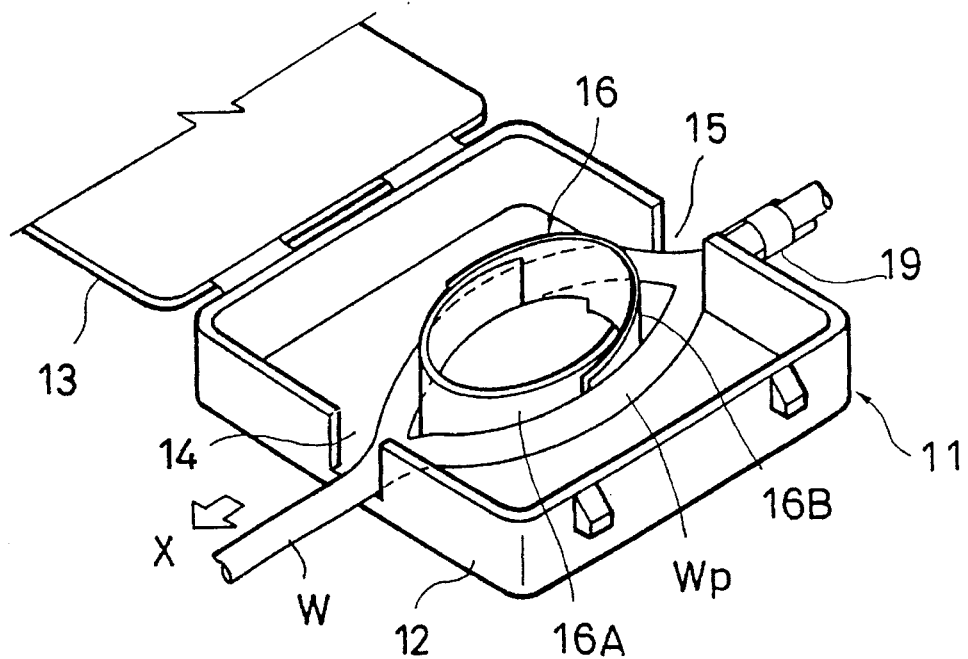
Figure 2:
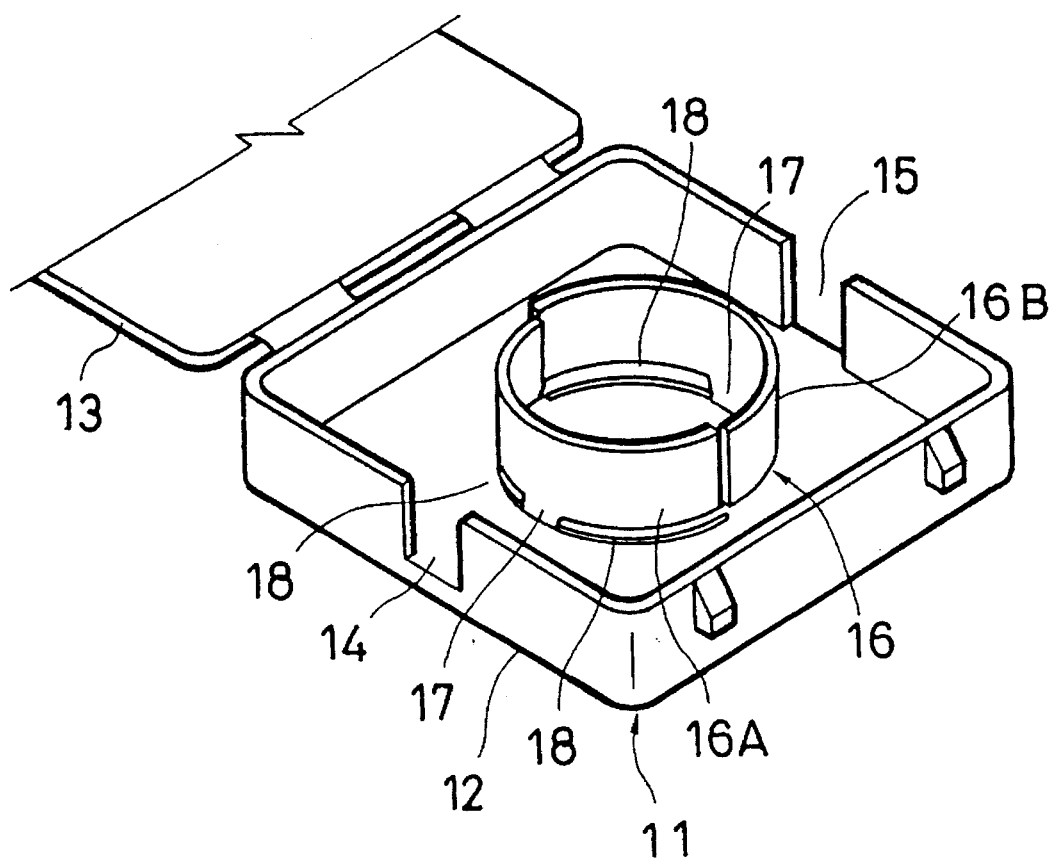
FIG. 2 is a perspective view showing a protector constituting the device according to the first embodiment of the present invention.

As shown in FIG. 2, the body 12 is provided on an internal surface (upper surface) at a center thereof with a cylindrical rib 16 which stands upright thereon. The rib 16 is divided into two half cylindrical ribs 16A and 16B. Each of the half cylindrical ribs 16A and 16B are connected with the upper surface of the body 12 through the intermediary of connecting parts 17, respectively. Each connecting part 17 is positioned at a center in the circumferential direction of each of the ribs 16A and 16B thereby to face to the respective guide holes 14 and 15. Beside the connecting parts 17, the ribs 16A and 16B are respectively separated from the upper surface of the body 12 through slits 18. With the above mentioned arrangement, the ribs 16A and 16B can operate as urging means capable of elastically deforming in an elliptic manner as shown in FIG. 1B.

Figure 1A:
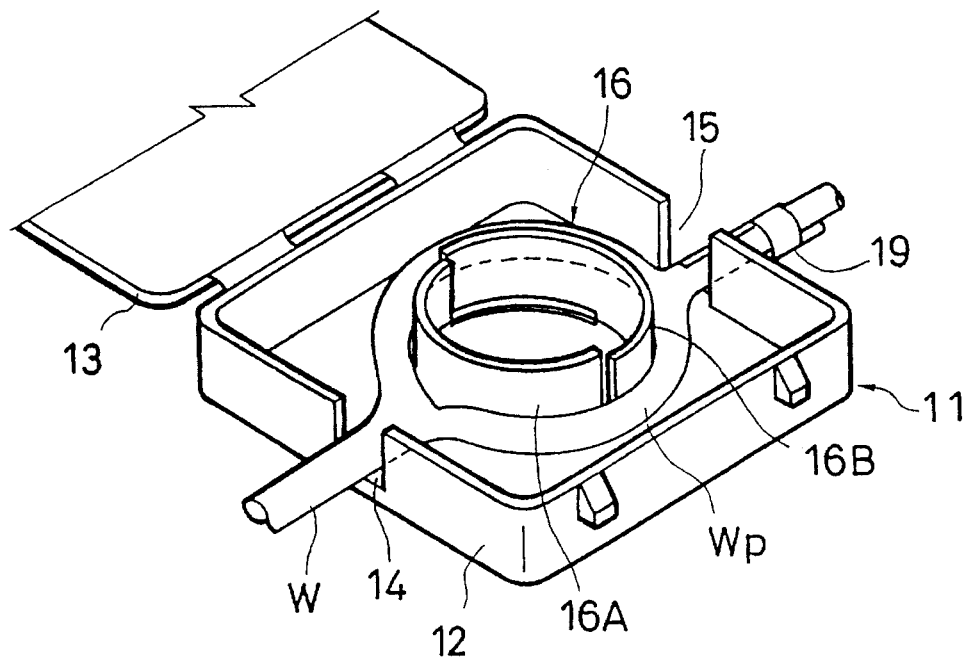

As shown in FIG. 1A, the wire harness W is divided into two slacken, or reserve parts Wp which are accommodated in the so-constructed protector 11 so as to engage with the peripheries of the ribs 16A and 16B. In the arrangement, projecting outwardly through the guide holes 14 and 15, one end of the wire harness W is in a free state and the other end thereof is secured with the protector 11 by means of a tape 19.

In operation of the above-mentioned guide device, as shown in FIG. 1B, when the other end of the wire harness W is pulled under tension in the direction of X so that it is expanded, the slacken, or reserve parts Wp approach mutually to each other in the width direction and correspondingly, the ribs 16A and 16B are deformed elliptically to support the slacken parts Wp, urging them to their original positions. Therefore, if the force exerted on the wire harness W is released, the ribs 16A and 16B would open outwardly, whereby the slacken parts Wp return to the respective original positions, as shown in FIG. 1A.

Figure 3:
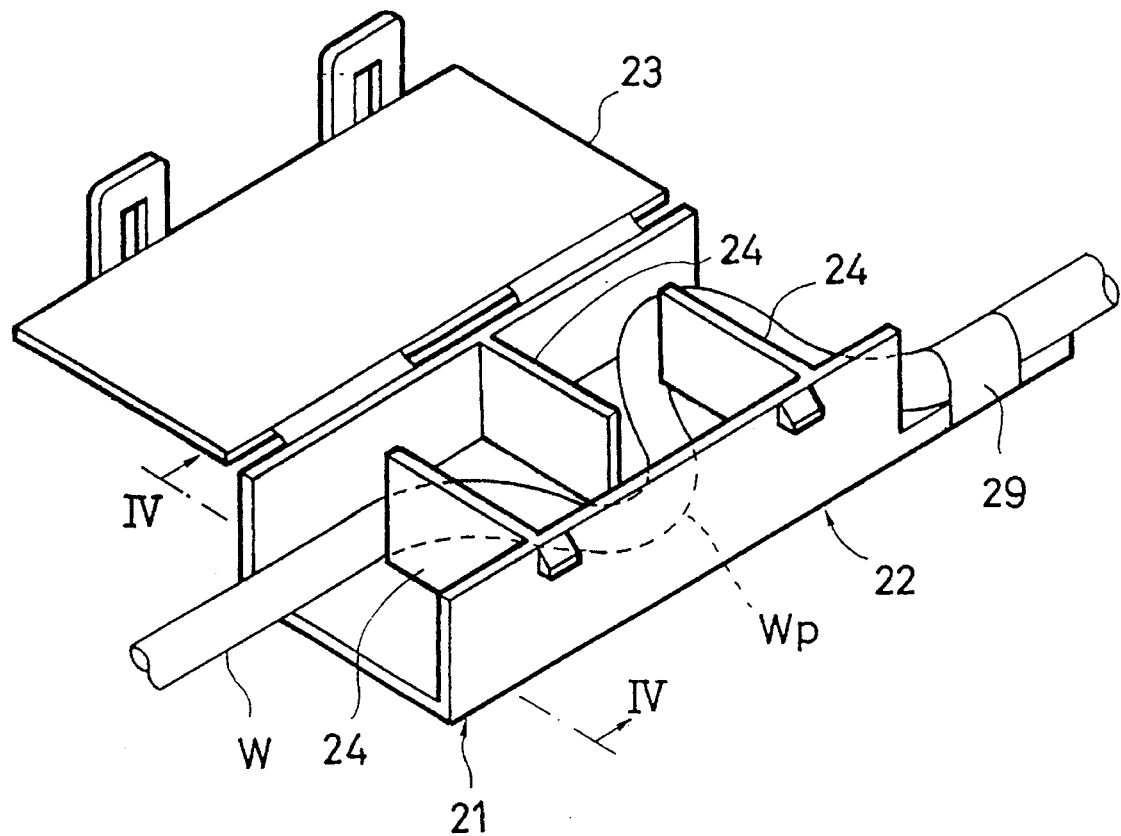
FIG. 3 is a perspective view showing an interior of a device when a wire harness accommodated therein is contracted, according to a second embodiment of the present invention.
Figure 4:
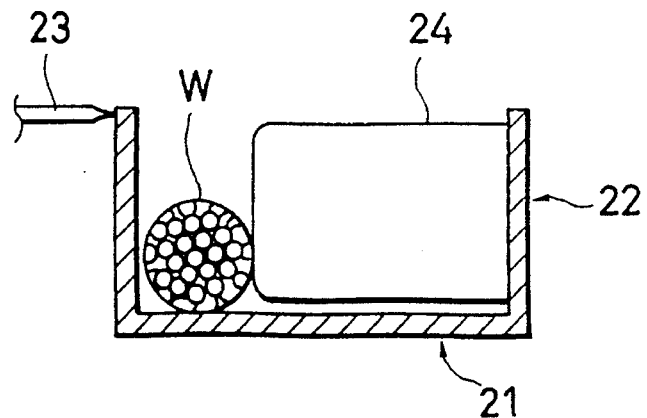
FIG. 4 is a cross-sectional view taken along the line IV—IV of FIG. 3.
Figure 5:
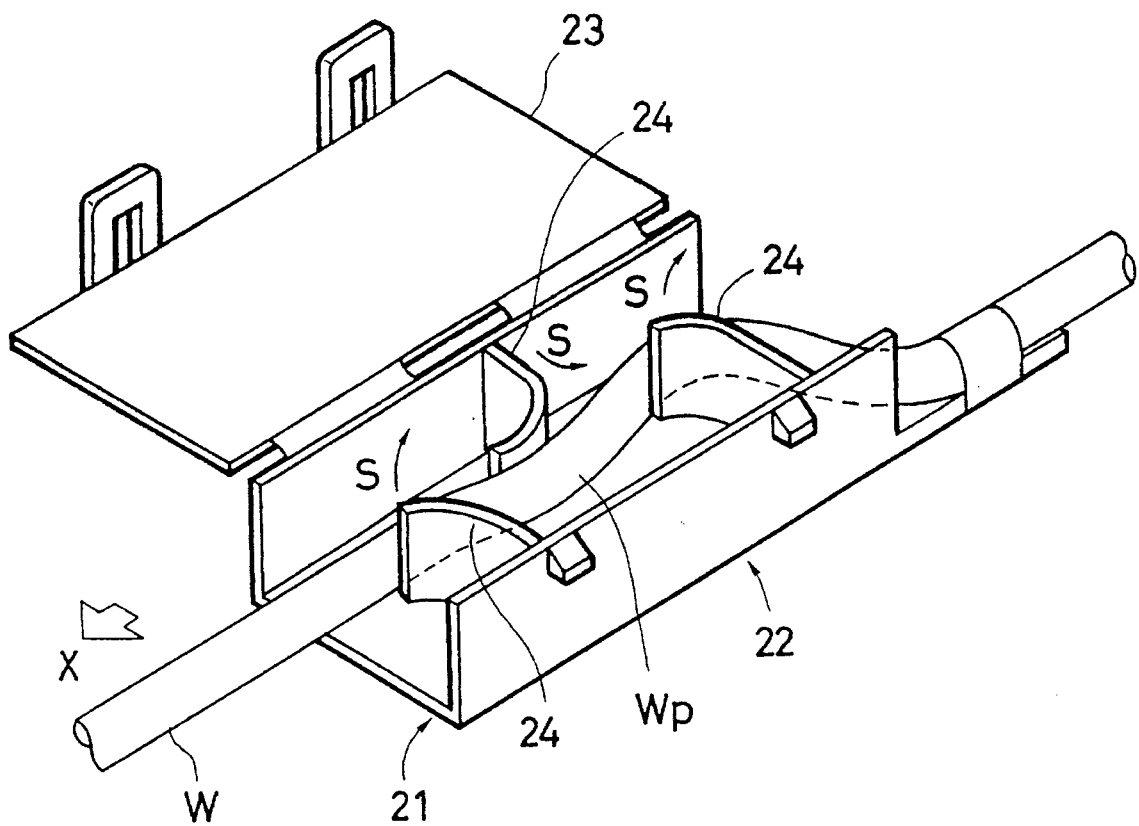
FIG. 5 is a perspective view showing the interior of the device when the wire harness is expanded, according to the second embodiment of the present invention.
Figure 6:
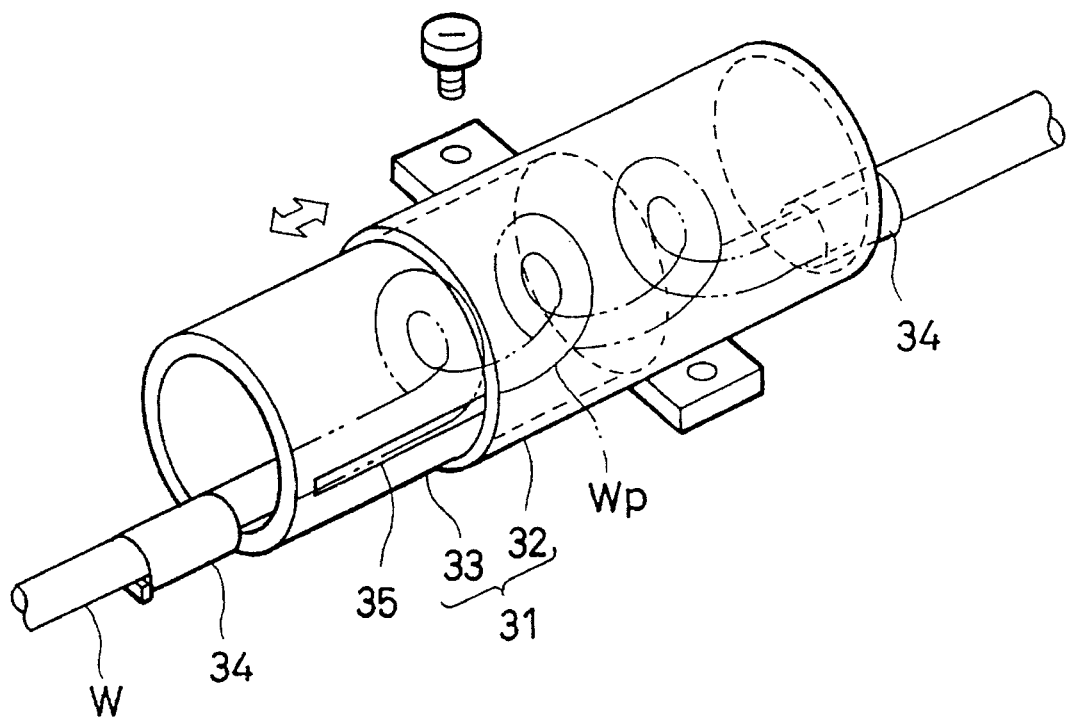
FIG. 6 is a perspective view showing a device when a wire harness accommodated therein is expanded, according to a third embodiment of the present invention.

We now describe the second embodiment of the present invention with reference to FIGS. 3 to 5.

The guide device in accordance with the embodiment includes a rectangular tube-shaped protector 21 (casing). The protector 21 comprises a substantially C-shaped body 22 and a flat plate-like lid 23 which are mutually locked to each other.

As shown in FIG. 3 and FIG. 4, the body 22 is provided inside thereof with a plurality of flexible ribs 24 (three libs in this embodiment) which are arranged apart from each other in a direction to pass the wire harness W therethough. Each of the flexible ribs 24 is constructed to be shorter than a width between side walls of the body 22. Respective ends of the ribs 24 are connected to the respective side walls by turns and the other ends are constructed so as to deform flexibly in the direction to pass the wire harness W therethough.

In an assembled state, the wire harness W is curved like a wave and its slacken part Wp is arranged in a labyrinth defined by the ribs 24 and the side walls. A part of the wire harness W is secured with the protector 21 by means of a tape 29.

In operation, when the other end of the wire harness W is pulled in the direction of X so that it is expanded as shown in FIG. 5, the slacken part Wp extends straight and correspondingly, the flexible ribs 24 are bent to support the slacken, or reserve parts Wp in a condition under which it is urged to its original configuration. Therefore, from the above condition, if the force exerted on the wire harness W is released, the ribs 24 would press the wire harness W to the directions of S in the process of return to the respective original positions, whereby the slacken part Wp return to the original wave-configuration, as shown in FIG. 3.

The third embodiment of the present invention is shown in FIGS. 6, 7, 8A and 8B.

In this third embodiment, a wire harness W having a spiral slacken parts Wp is used. By embedding an elastic member such as a spiral spring therein, it is possible for the slacken, or reserve parts Wp to a nature to return a spiral object of a constant diameter in a free state. That is, in this embodiment, the slacken part Wp itself constitutes urging means of the invention.

A protector 31 is arranged to cover the spiral slacken part Wp. The protector 31 has a double-tubing construction consisted of an immovable protector (outer tube) 32 and a movable protector (inner tube) 33 both of which are limited to rotate mutually to each other by a rotation stopper 35. The immovable protector 32 is connected with a steering column. By means of respective tapes 34, one end of the wire harness W is fixed with the immovable protector 32 and the other end of the harness W is connected with the movable protector 33.

Figure 7:
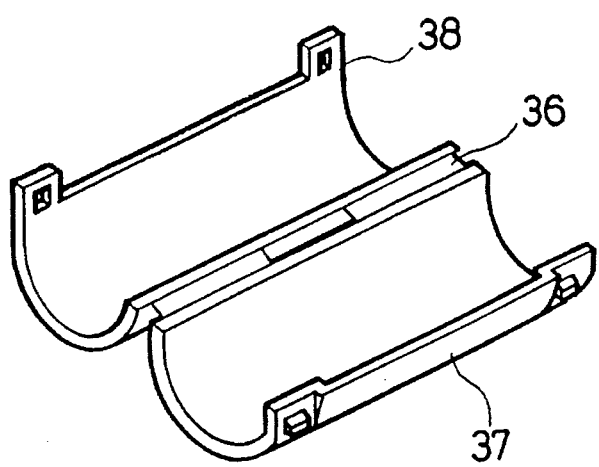
FIG. 7 is a perspective view showing an example of a protector constituting the device according to the third embodiment of the present invention.

As shown in FIG. 7, in another form of the embodiment, both of the protectors 32 and 34 may be respectively divided into a body 37 and a lid 38 connected therewith through the intermediary of a hinge 36, from a point of easiness to arrange the wire harness W therein. Further, the respective cross-sectional shapes of the protectors 32 and 34 may be formed to be rectangular, elliptic or triangular, without a limitation to the circular section shown in the figures.

Figure 8A:
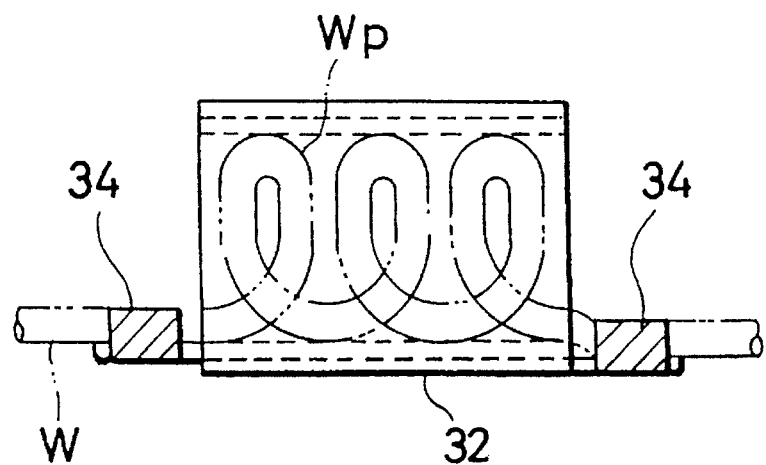
Figure 8B:
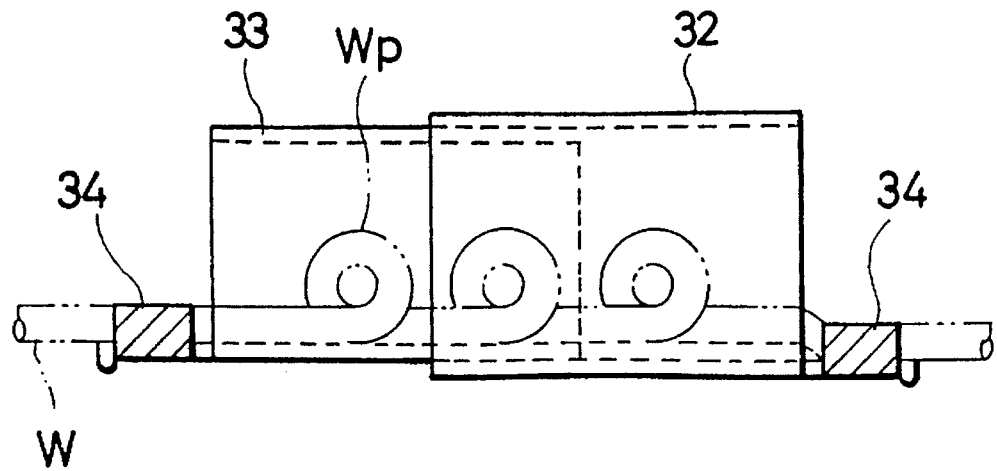

In operation, when the other end of the wire harness W is pulled as shown in FIG. 8B, the diameter of the spiral slacken, or reserve part Wp is decreased, so that the wire harness W extends and the movable protector 33 is slidden correspondingly, protecting the slacken parts Wp. On the other hand, when the force exerted on the wire harness W is released, the diameter of the spiral slacken part Wp is recovered to the original diameter because of its urging function and simultaniously, the movable protector 33 is accommodated in the immovable protector 32.

We further describe the fourth embodiment of the present invention with reference to FIGS. 9, 10A, 10B, 11A and 11B.

The guide device in accordance with this embodiment includes a rectangular tube-shaped protector 41 (casing) through which the wire harness W passes. The protector 41 comprises an outer tube-shaped protector 42 and an inner tube-shaped protector 43 inserted thereinto.

Figure 10A:
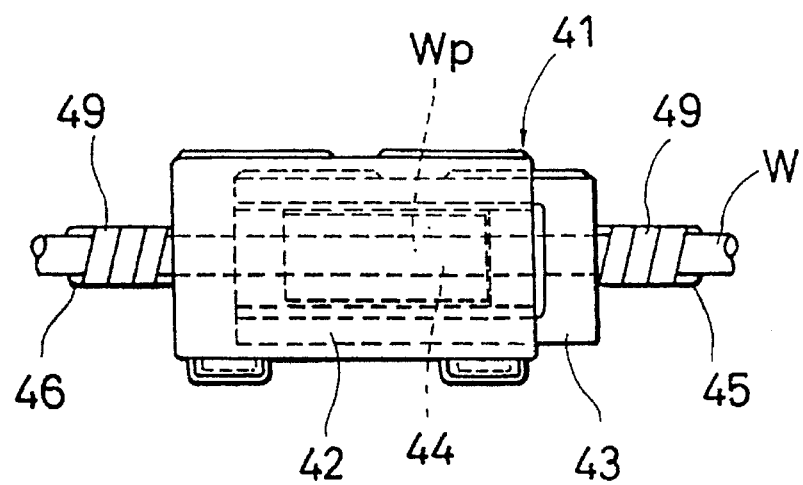
Figure 10B:
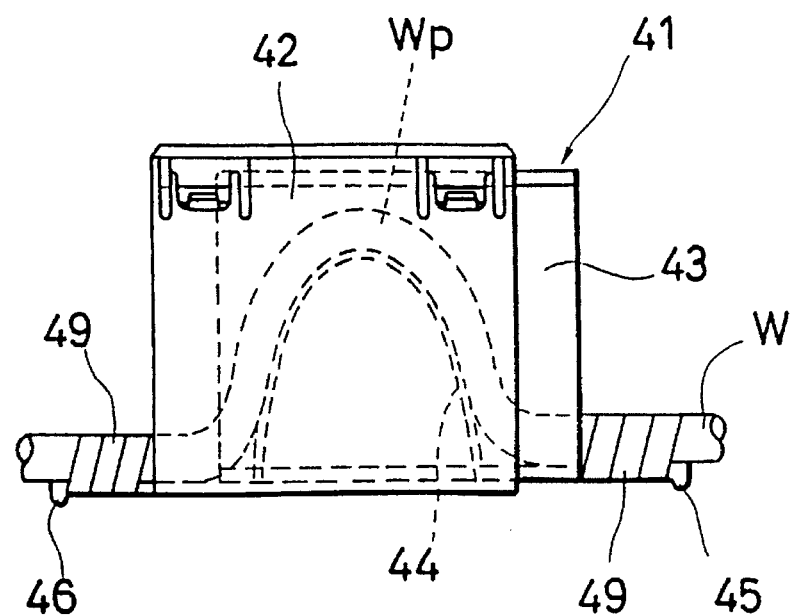

Arranged inside the protector 41 is a strip of plate member 44 which has one end thereof connected to the outer protector 42 and the other end thereof connected to the inner protector 43. In such a shrunk condition that the inner protector 43 is inserted into the outer protector 42 as shown in FIGS. 10A and 10B, the plate member 44 curves like a substantial arc thereby to operate as means for urging the slacken, or reserve parts Wp of the wire harness W passing through the protector 41. Conversely, in an expanded condition under which the inner protector 43 is drawn from the outer protector 42 as shown in FIGS. 11A and 11B, the plate member 44 is changed into a substantially flat plate.

The outer protector 42 is provided with a wire harness fixing part 46 which protrudes from an opening end thereof. Similarly, the inner protector 43 is also provided with another wire harness fixing part 45 protruding from an opening end thereof. The wire harness W passing through the protector 41 is secured to the fixing parts 45 and 46 by the aid of tapes 49, respectively.

Figure 9:
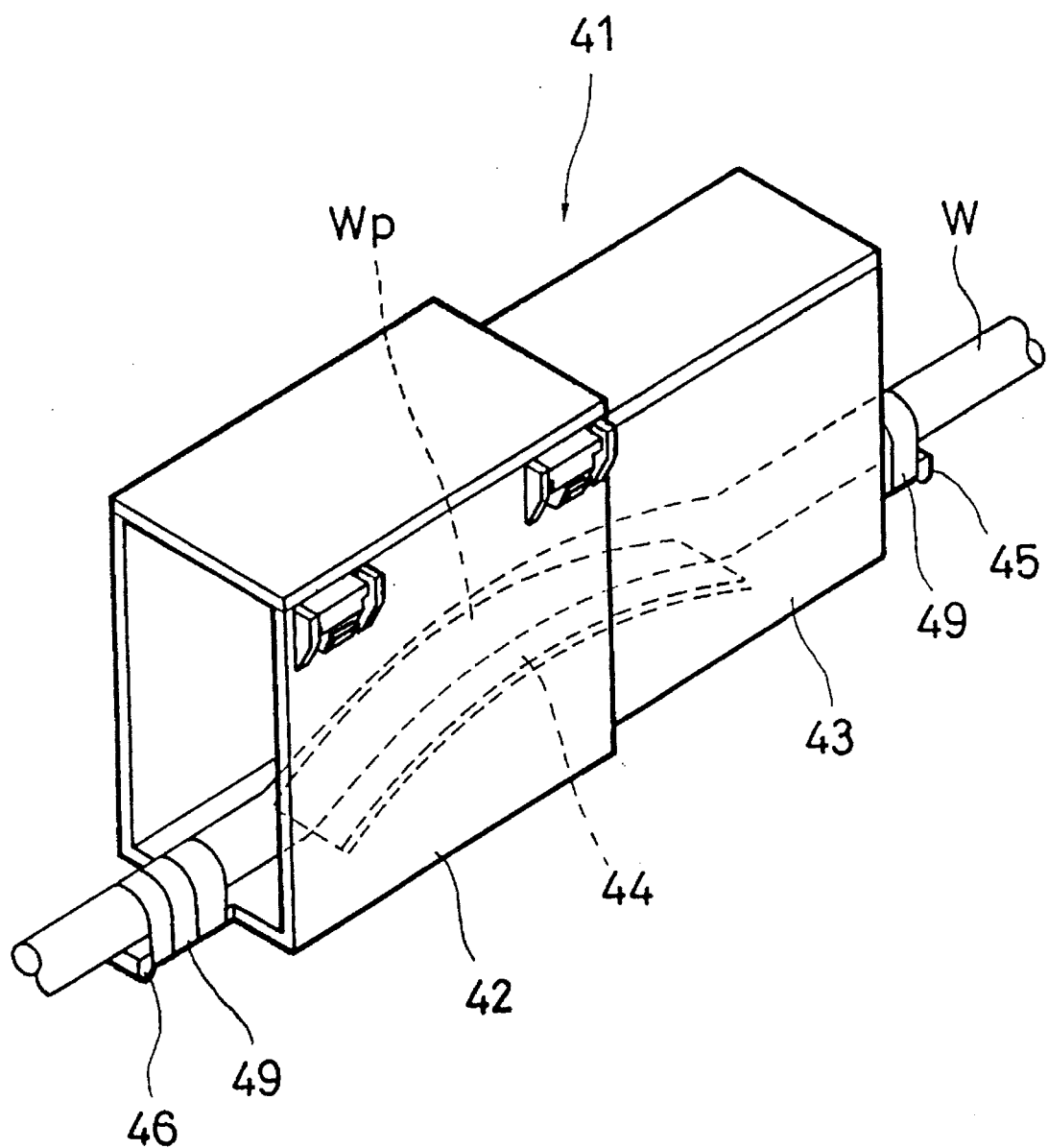
FIG. 9 is a perspective view showing an example of a protector constituting a device according to a fourth embodiment of the present invention.
Figure 11A:
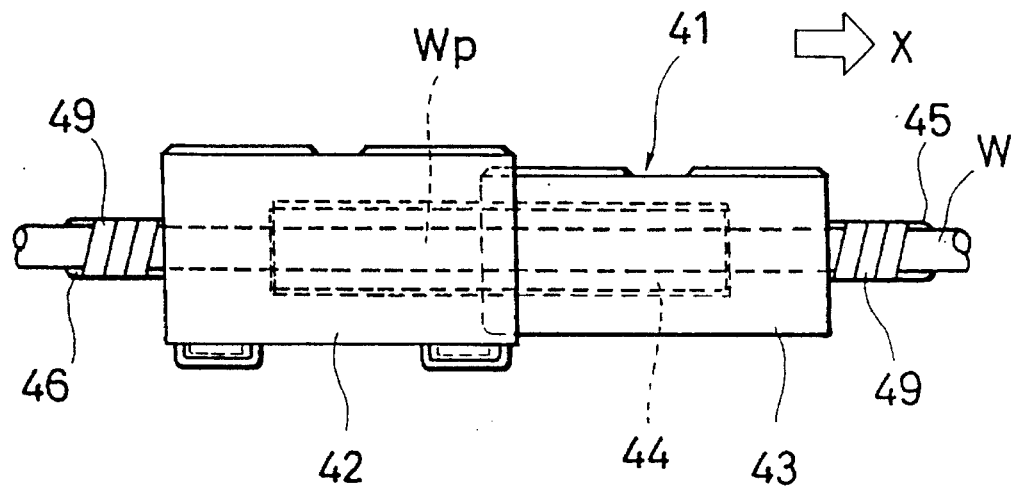
Figure 11B:
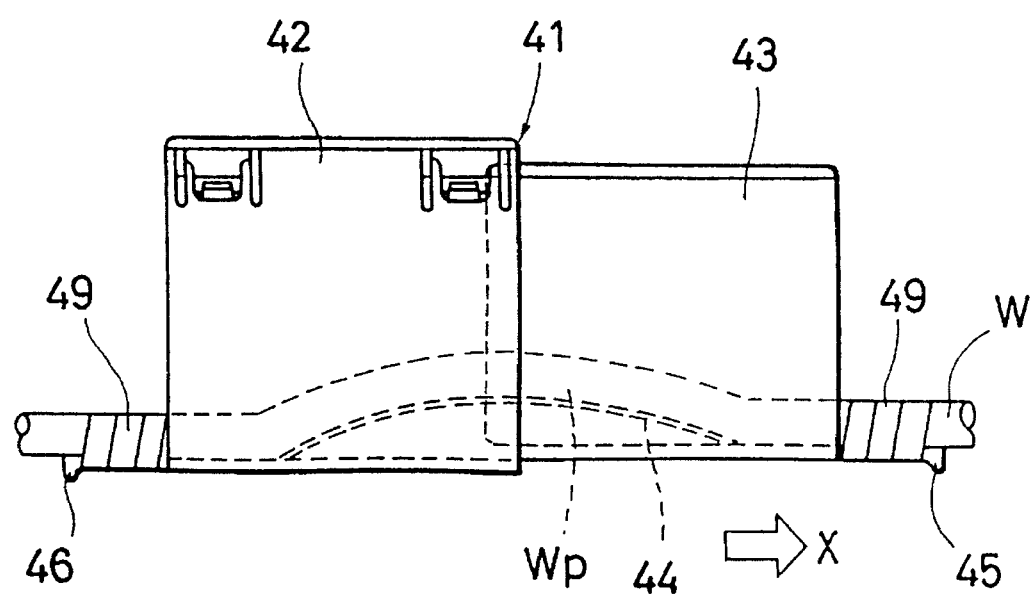

In operation, when the other end of the wire harness W is pulled in the direction of X thereby to expand as shown in FIGS. 9, 11A and 11B, the slacken part Wp extends straight and correspondingly, the plate member 44 is depressed. On the other hand, when the force exerted on the wire harness W is released, the plate member 44 recovers to the original configuration of an arc and thus urging the slacken part Wp to reappear to the original configuration shown in FIGS. 10A and 10B. In the embodiment, even if the plate member 44 has a plastical deformation a little, it is certainly that the wire harness W can be occupy the original position from its expanded condition.

Figure 12:
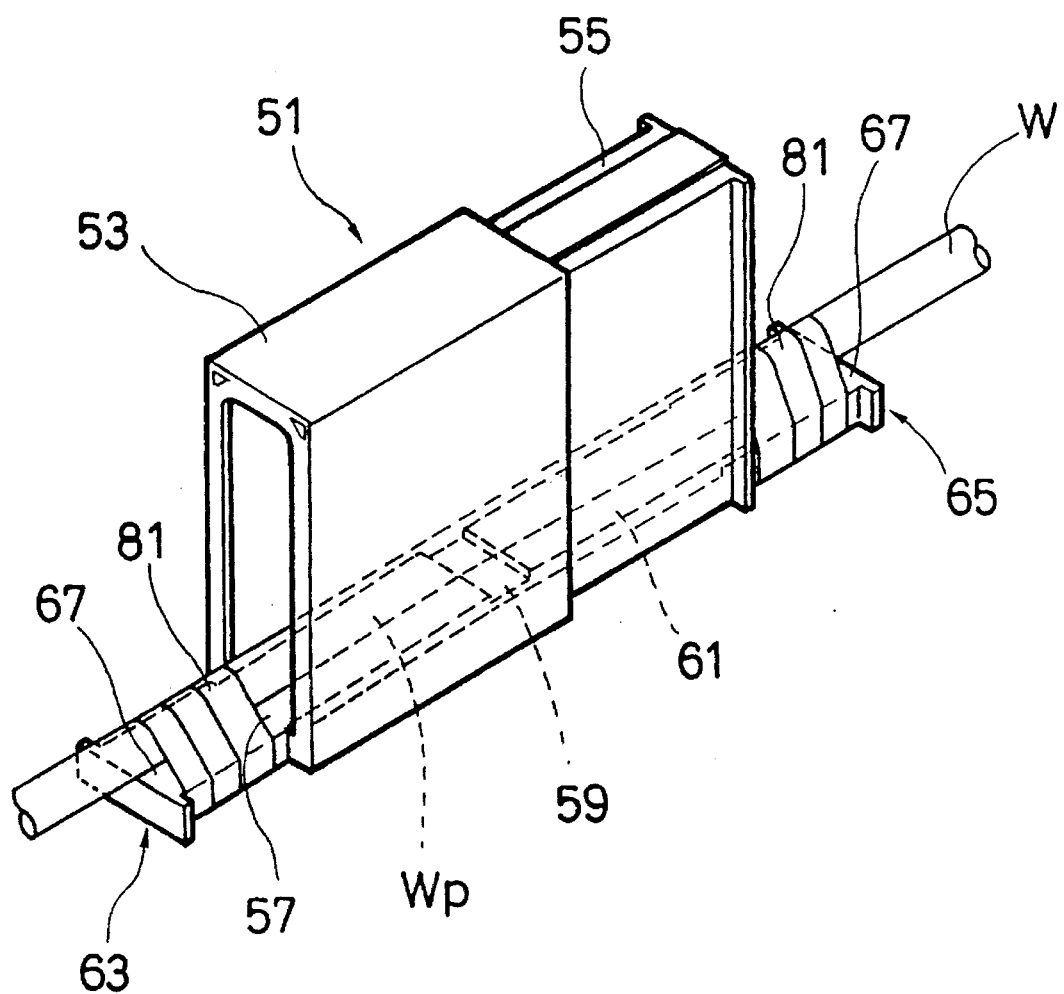
FIG. 12 is a perspective view showing an example of a protector constituting a device according to a fifth embodiment of the present invention.

The fifth embodiment of the present invention is now described with reference to FIGS. 12, 13A and 13B.

The guide device in accordance with this embodiment also includes a rectangular tube-shaped protector 51 through which the wire harness W passes. The protector 51 comprises an outer tube-shaped protector (protecting member) 53 and an inner tube-shaped protector (protecting member) 55 inserted thereinto.

Arranged inside the protector 51 is an elongated connecting member 57 which has one end thereof connected to the outer protector 53 and the other end thereof connected to the inner protector 55 thereby to connect the former with the latter. The connecting plate member 57 comprises a plate part 61 provided at a center thereof with a recess (bending part) 59 and two engaging parts 63 and 65 arranged on both ends of the plate part 61, respectively.

Figure 13A:
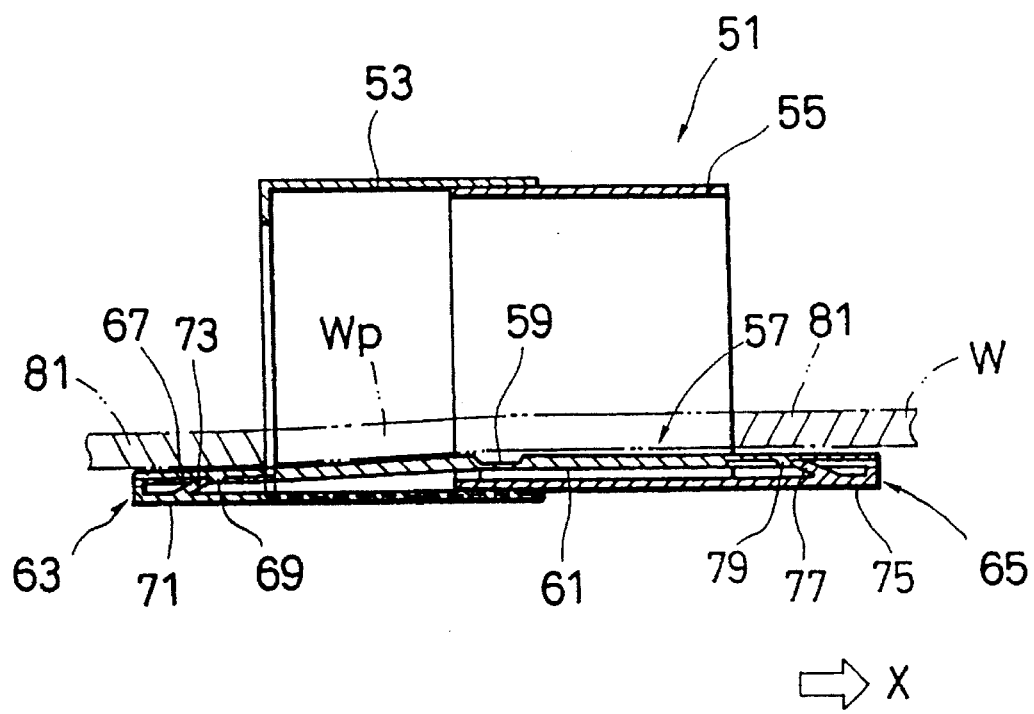
Figure 13B:
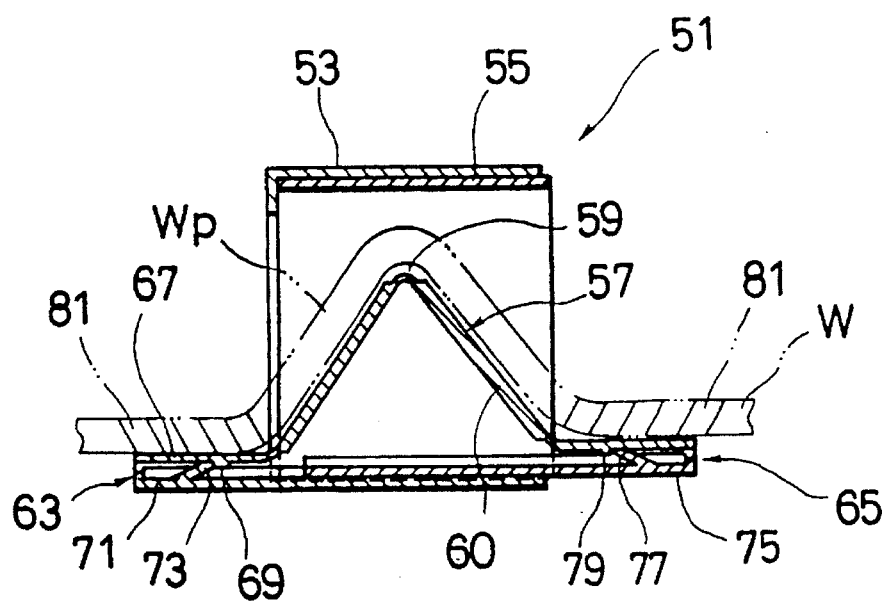

As shown in FIG. 13A, the engaging part 63 is tubular-shaped to have a projection 69 formed on an inside wall of a tubular part 67. A wire harness fixing part 71 arranged on an opening end of the outer protector 53 is engaged into the tubular part 67. With the arrangement where the projection 69 engages with a flexible locking arm 73 formed on the wire harness fixing part 71, the engaging part 63 can be engaged with the fixing part 71.

Similarly, a wire harness fixing part 75 which is arranged on an opening end of the inner protector 55 is engaged into the other engaging part 65. In an assemble state, with the arrangement where a projection 79 engages with a flexible locking arm 77 formed on the wire harness fixing part 75, the engaging part 65 can be engaged with the fixing part 75.

In the expanded condition under which the inner protector 55 is drawn out of the outer protector 42 as shown in FIG. 13A, the plate part 61 is changed to a form like a substantial flat plate. Conversely, in the shrunk condition under which the inner protector 55 is inserted into the outer protector 42 as shown in FIG. 13B, the plate part 61 is changed to another form like a mountain due to a bending of the recess 59 itself, whereby the part 61 operates as means for urging the slacken, or reserve parts Wp of the wire harness W passing through the protector 51. Note that, the wire harness W which passes through the protector 51 is secured to the engaging parts 63 and 65 of the connecting plate member 57 and the fixing parts 71 and 75 by the aid of tapes 81, respectively.

In operation, when the other end of the wire harness W is pulled in the direction of X thereby to expand as shown in FIG. 13A, the slacken, or reserve part Wp extends straight and correspondingly, the connecting plate member 57 is depressed. On the other hand, when the force exerted on the wire harness W is released, the connecting plate member 57 recovers to the original configuration of a mountain and thus urging the slacken part Wp to reappear to the original configuration shown in FIG. 13B.

According to the embodiment, since the wire harness W is positively urged beforehand, even when the expanding and contracting operations are applied on the harness W, neither an unexpected and unreasonable stress nor an idleness is not produced thereon, whereby the generation of noise can be avoided. Further, due to its simple structure, the miniaturization of the device can be promoted. Similarly to the previous embodiment, even if the connecting plate member 57 has a plastical deformation a little, it is certainly that the wire harness W can be occupy the original position from its expanded condition.

Figure 14:
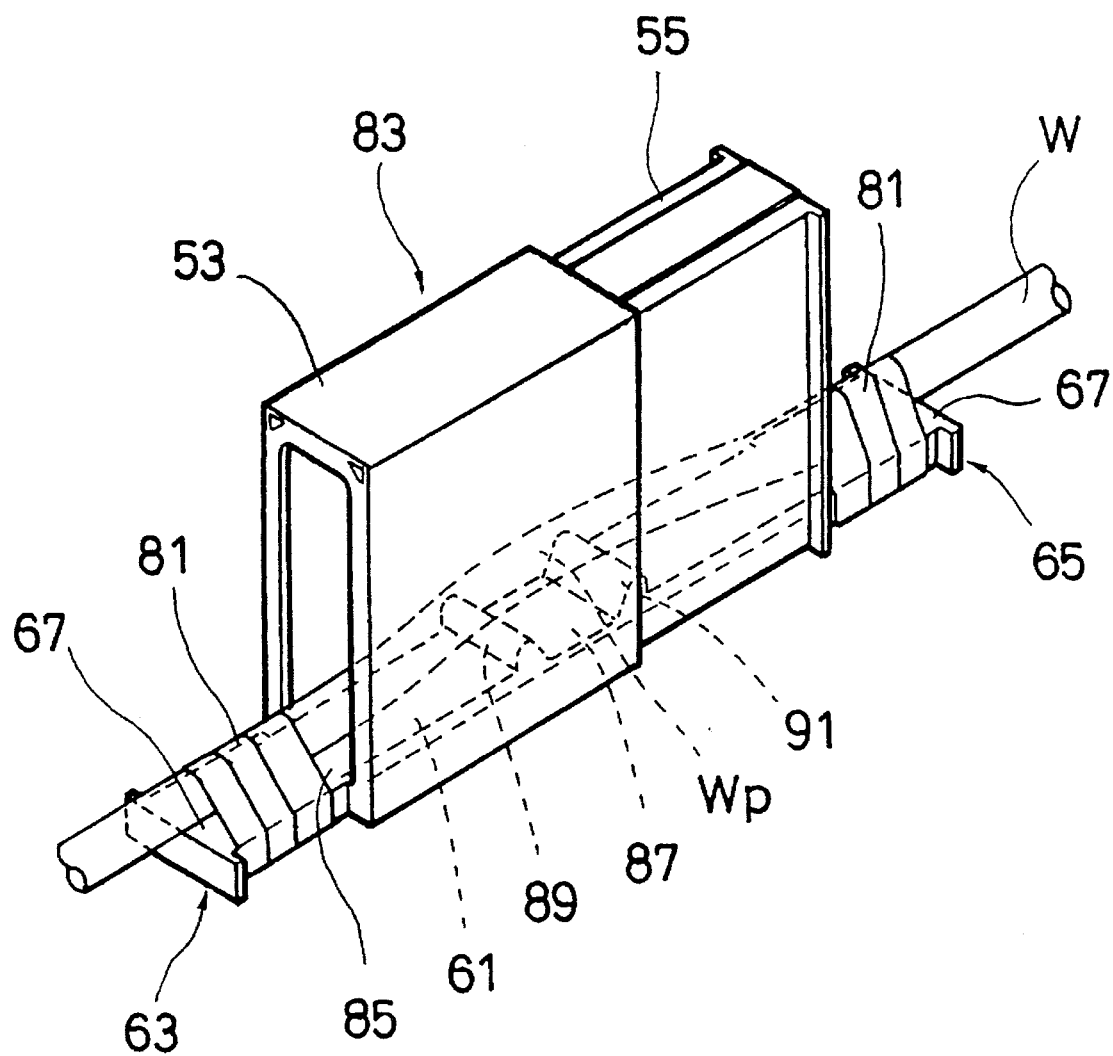
FIG. 14 is a perspective view showing an example of a protector constituting a device according to a sixth embodiment of the present invention.

Next, the sixth embodiment of the present invention is now described with reference to FIGS. 14, 15A and 15B.

Note, in this embodiment, the elements similar to those in the afore-mentioned fifth embodiment are indicated by the same reference numerals and the descriptions of the elements are deleted.

The guide device in accordance with the embodiment also includes a rectangular tube-shaped protector 83 through which the wire harness W passes. The protector 83 comprises the outer tube-shaped protector 53 and the inner tube-shaped protector 55 inserted thereinto.

Arranged inside the protector 83 is a connecting plate member 85 which connects the outer protector 53 with the inner protector 55. The connecting plate member 85 has a recess 87 formed at a center thereof. The recess 87 has a bottom which is thinner than that of the plate part 61. The recess 87 is provided both sides thereof with projections 89 and 91.

Figure 15A:
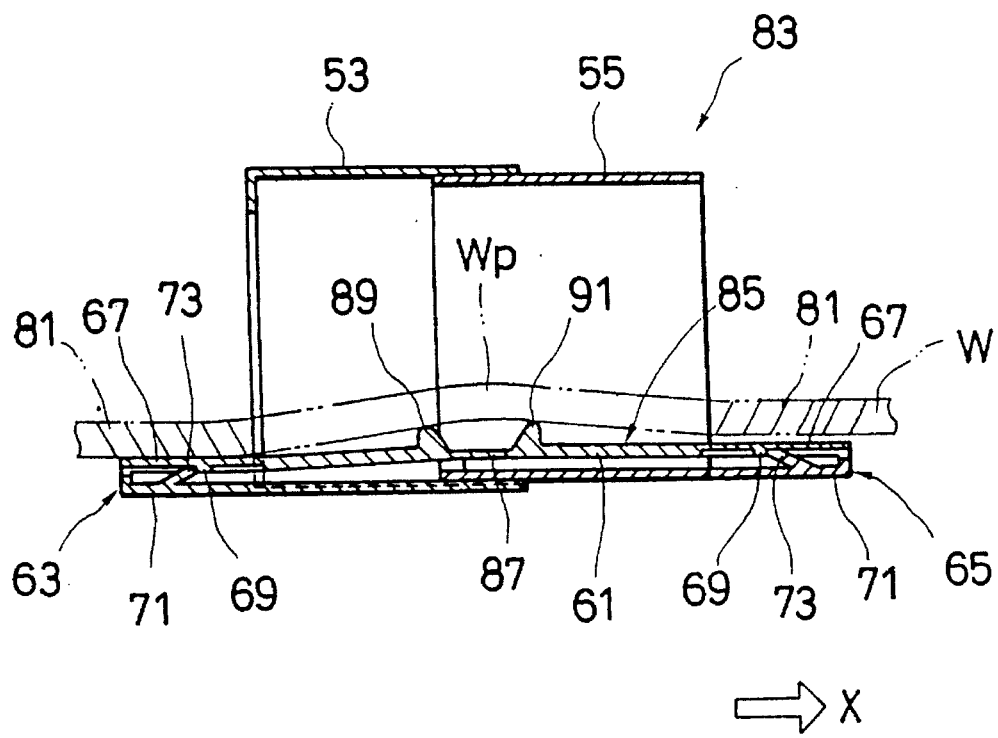
Figure 15B:
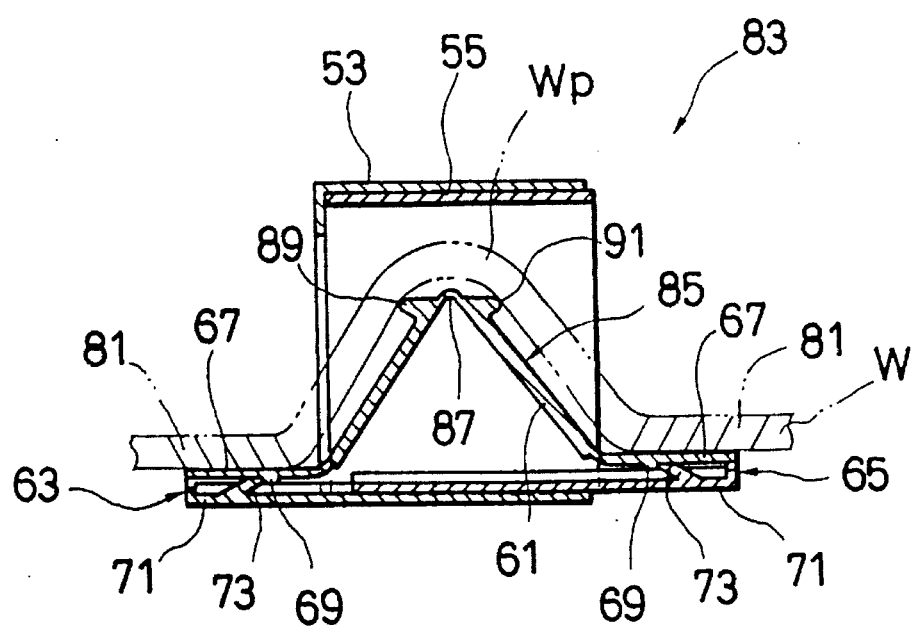

Also in this embodiment, when the other end of the wire harness W is pulled in the direction of X thereby to expand as shown in FIG. 15A, the slacken, or reserve part Wp extends straight and correspondingly, the connecting plate member 85 is depressed. On the other hand, when the force exerted on the wire harness W is released, the connecting plate member 85 recovers to the original configuration of a mountain and thus urging the slacken part Wp to reappear to the original configuration shown in FIG. 15B. Then, since the connecting plate member 85 urges the wire harness W at 2 points of the projections 89 and 91, the wire harness W is deformed with a large radius, so that the stress on the slacken part Wp can be reduced. Note, also in the embodiment, even if the connecting plate member 85 has a plastical deformation a little, it is certainly that the wire harness W can be occupy the original position from its expanded condition.

Figure 16:
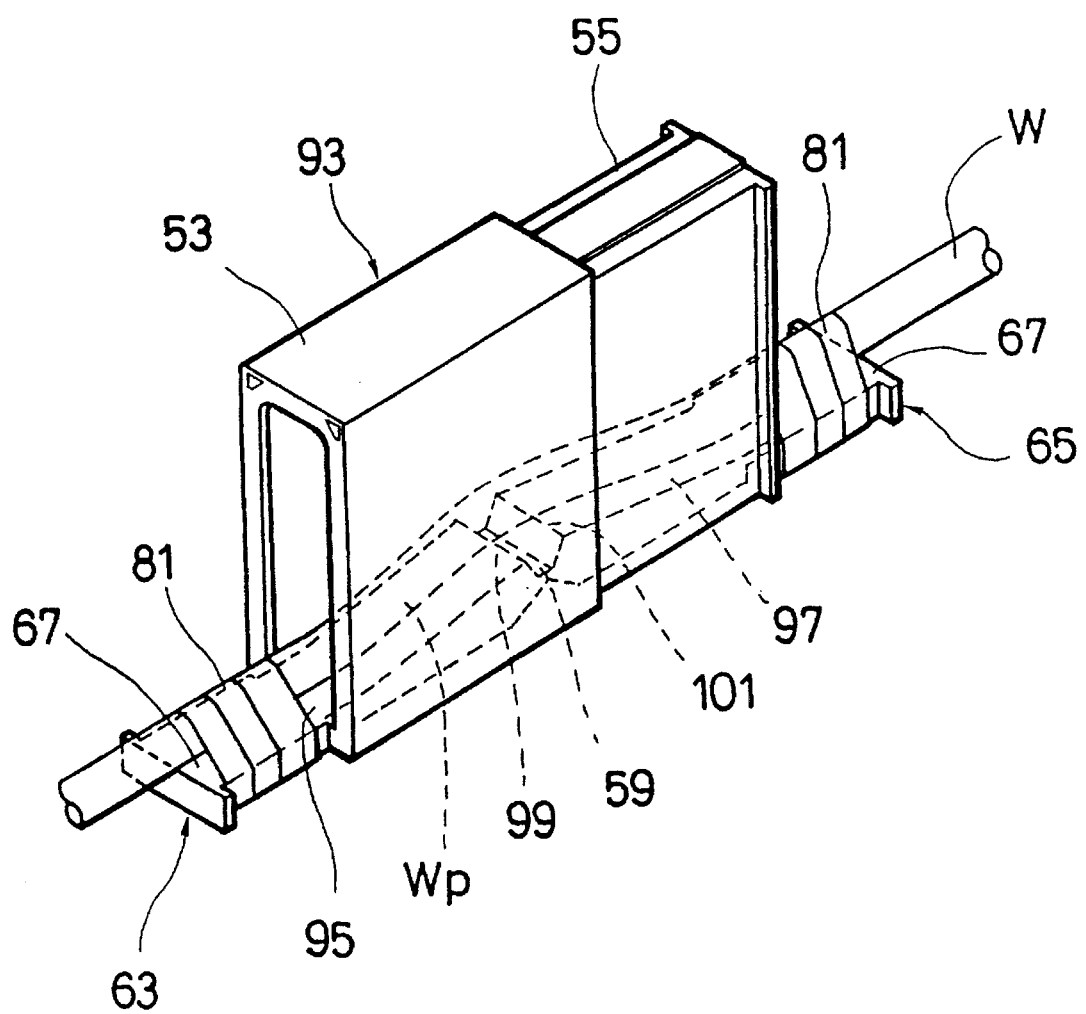
FIG. 16 is a perspective view showing an example of a protector constituting a device according to a seventh embodiment of the present invention.

The seventh embodiment of the present invention is described with reference to FIGS. 16, 17A and 17B. Note, also in this embodiment, the elements similar to those in the fifth and sixth embodiments are indicated by the same reference numerals and the descriptions of the elements are deleted.

The guide device in accordance with the embodiment also includes a rectangular tube-shaped protector 93 through which the wire harness W passes. The protector 93 comprises the outer tube-shaped protector 53 and the inner tube-shaped protector 55 inserted thereinto. Arranged inside the protector 93 is a connecting plate member 95 which connects the outer protector 53 with the inner protector 55.

The connecting plate member 95 includes a plate part 97 which has a substantially C-shaped cross-section and a thickness gradually increased from the respective engaging parts 63 and 65 toward the recess 59. Therefore, the connecting plate member 95 has the highest corner parts 99 and 101 formed on both sides of the recess 59.

Figure 17A:
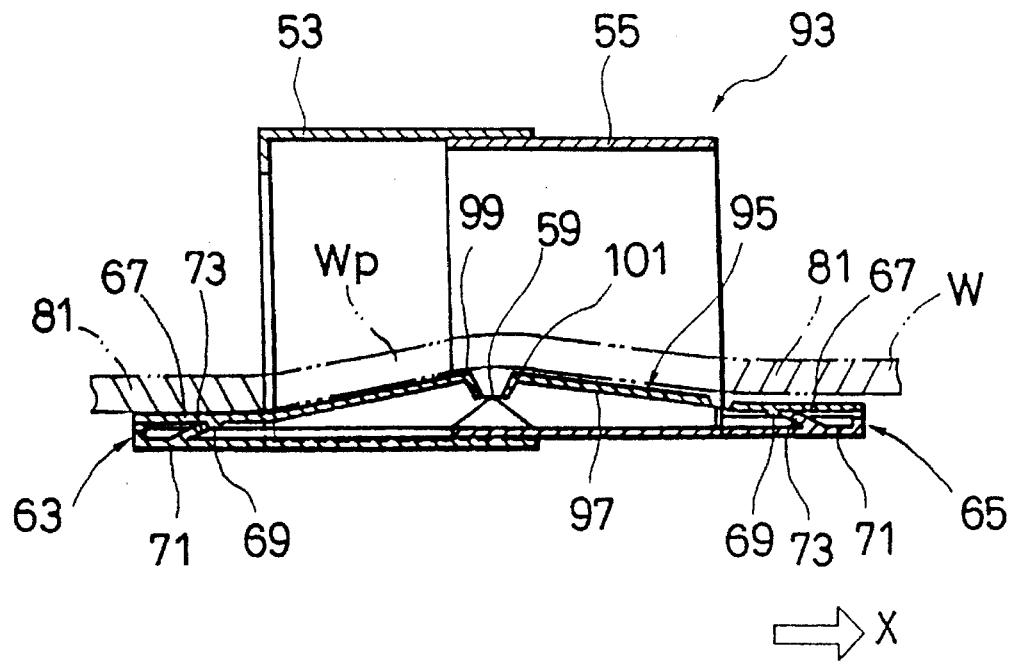
Figure 17B:
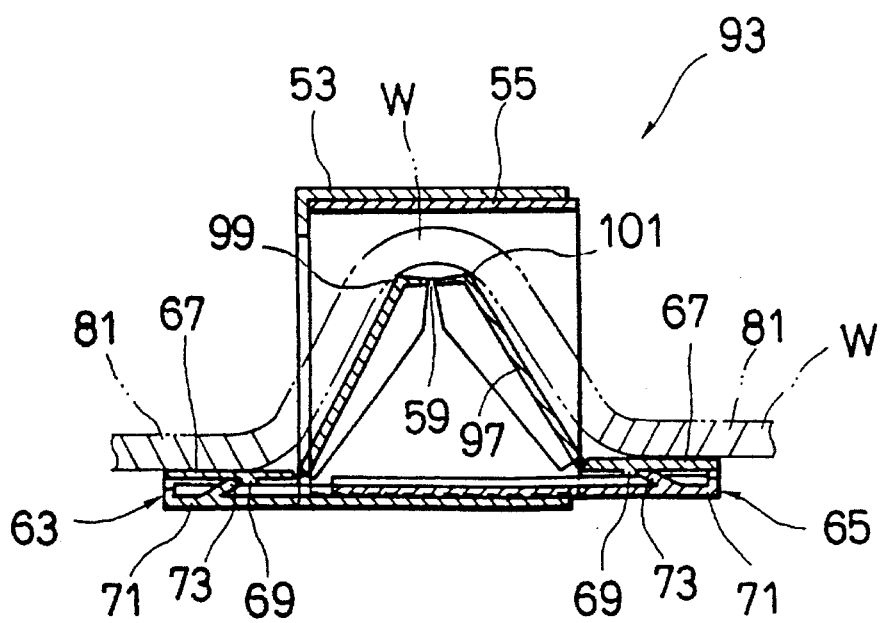

Also in this embodiment, when the other end of the wire harness W is pulled in the direction of X thereby to expand as shown in FIG. 17A, the slacken part Wp extends straight and correspondingly, the connecting plate member 95 is pressed downwardly to support the wire harness W thereon, urging it for its original position. On the other hand, when the force exerted on the wire harness W is released, the connecting plate member 95 recovers to the original configuration of a mountain and thus urging the slacken part Wp to reappear to the original curved configuration shown in FIG. 17B. Then, since the connecting plate member 85 urges the wire harness W at 2 points of the corner parts 99 and 101, it is possible to deform the wire harness W with a large radius, so that the stress on the slacken part Wp can be reduced.

In addition, since both corner parts 99 and 101 are formed to be the highest and the connecting plate member 95 is shaped to be a gently-sloping mountain, it is possible to return the slacken, or reserve part Wp to the original position smoothly when the force exerted on the wire harness W is released.

Figure 18:
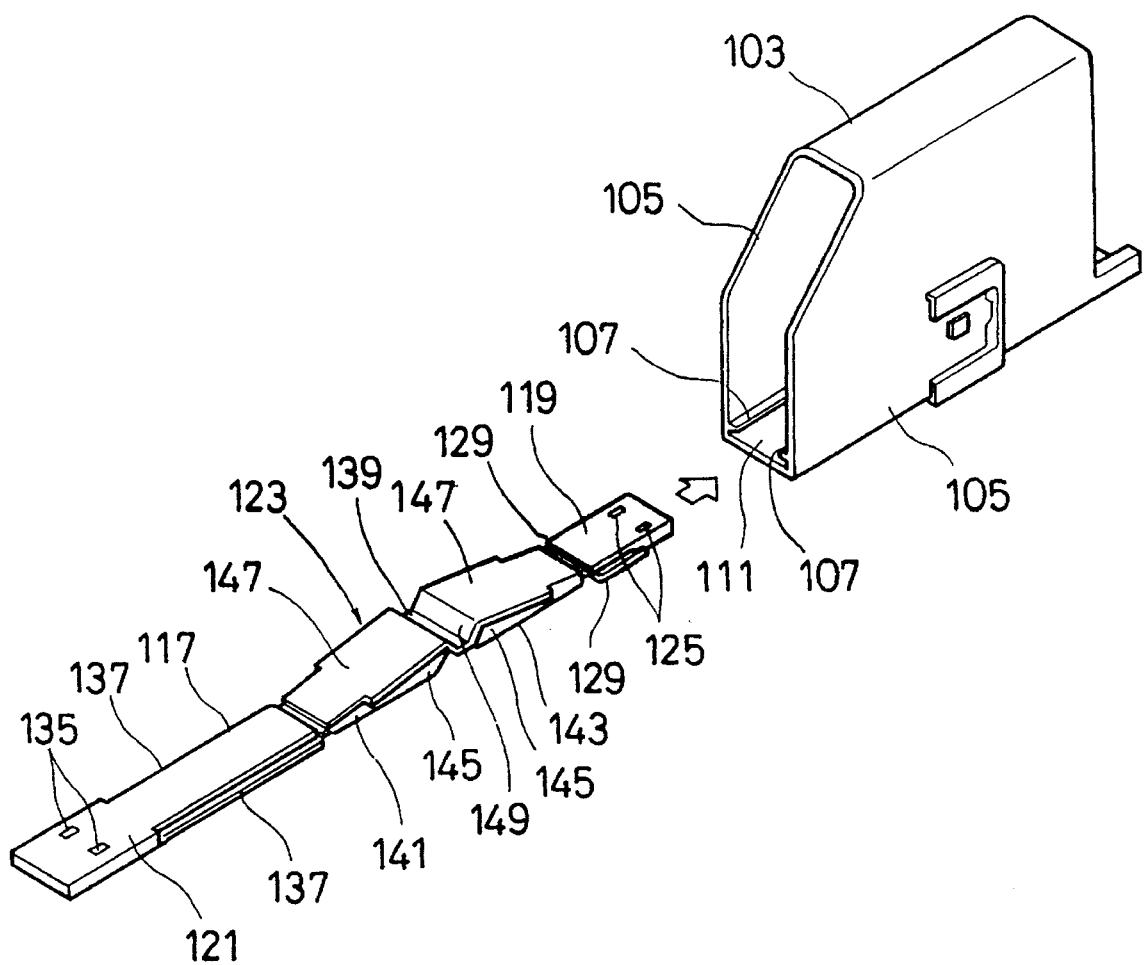
FIG. 18 is a perspective view showing an example of a protector constituting a device according to a eighth embodiment of the present invention.

Next, the eighth embodiment of the present invention is now described with reference to FIGS. 18, 19A and 19B.

Figure 19:
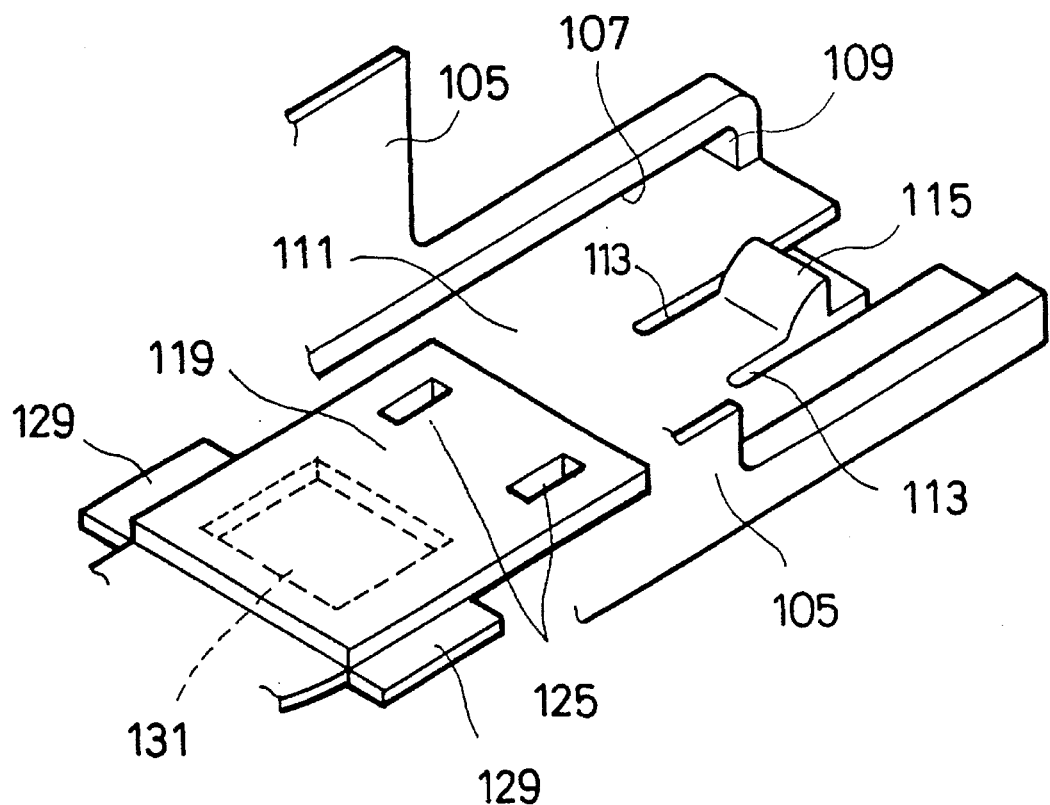
FIG. 19 is a perspective enlarged view showing a part of a protector constituting a device according to a ninth embodiment of the present invention.

The guide device in accordance with the embodiment also includes a rectangular tube-shaped protector 103 through which the wire harness W passes. Inside of the protector 103, sliding grooves 107 are formed on lower portions of side walls 105 of the protector 103 along the direction that the harness W passes therein. The sliding grooves 107 are closed at one ends thereof by stop walls 109, respectively, as shown in FIG. 19. The sliding grooves 107 are provided on a bottom surface 111 thereof with two slits 113 between which an engaging projection 115 is formed. In the assemble state, the engaging projection 115 is engaged with a band plate 117 arranged in the protector 103.

Figure 20:
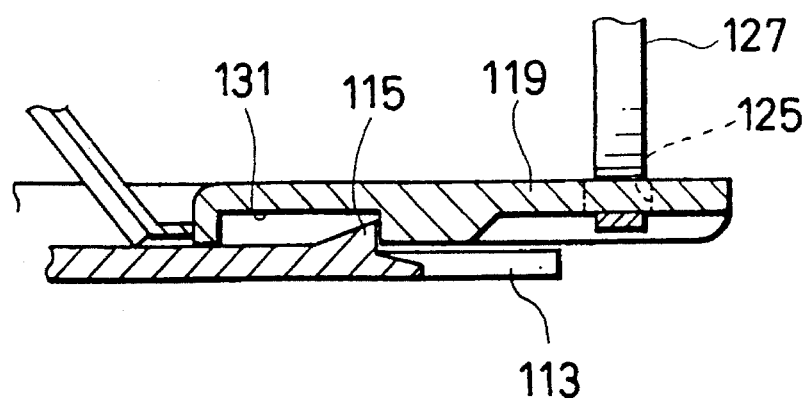
FIG. 20 is a cross-sectional view showing a relationship between the protector and a belt plate.

The elongated band plate 117 is provided at both ends thereof with harness fixing parts 119 and 121, respectively, between which a bending part 123 is arranged. The harness fixing part 119 has a pair of rectangular through holes 125 into which a band-like clip 127 for fixing the wire harness W is inserted. Further, the part 119 includes guide plates 129 each of which is formed on each side thereof to project to the width direction. These guide plates 129 fit the sliding grooves 107, respectively. Again, as shown in FIG. 20, the harness fixing part 119 is provided on a back surface thereof with a rectangular recess 131 with which the engaging projection 115 is engaged. With this arrangement, the fixing part 119 on one side of the band plate 117 can be secured with the protector 103.

The other harness fixing part 121 is formed so as to be longer than the former fixing part 119 and to have a pair of rectangular through holes 135 into which the band-like clip 127 is inserted. Further, between these through holes 135 and the bending part 123, the part 121 has guide plates 137 each of which is formed on each side in a direction of width thereof. The guide plates 137 are slidably engaged in the above-mentioned sliding grooves 107, respectively.

The bending part 123 comprises plate parts 141 and 143 which have the respective ends connected with the harness fixing parts 119 and 121, respectively. The other end of the plate part 141 is connected with the other end of the plate part 143 through the intermediary of the bending part 139. Arranged on both sides of the plate parts 141 and 143 in their width directions are side plates 145 which are so formed that their width dimensions increase gradually toward the bending part 139 and on which wide parts 147 are formed, respectively. Leading ends of the wide parts 147 are bent for the bending part 139 to form corner parts 149 facing to each other.

In the assembled state, one end of the "slacken," or reserve part Wp of the wire harness W is fixed on the harness fixing part 119 by the band-like clip 127 and the other end of the slacken part Wp is fixed on the other harness fixing part 121 by the band-like clip 127. Further, the harness fixing part 119 is engaged with the protector 103 and the other harness fixing part 121 is slidably engaged with the protector 103. When the harness fixing part 121 is slid apart from the protector 103, the band plate 117 is deformed to be substantially flat, as shown in FIG. 21B. In this case, although the bending part 123 approaches a substantially flat plate, it becomes to be a gentle-sloping mountain having apexes of the corner parts 149 since the side plates 145 of the plate parts 141 and 143 are formed in such a manner that their width dimensions increase gradually toward the bending part 139. Therefore, even if the slacken part Wp is expanded, the wire harness W is urged so that the slacken part Wp recovers the original configuration.

On the other hand, in the case that the harness fixing part 121 is slid to the protector 103, the bending part 139 is bent to raise the plate parts 141 and 143, whereby the bending part 123 deforms like a mountain. Then, the highest bending part 139 and the corner parts 149 support the wire harness W.

Figure 21A:
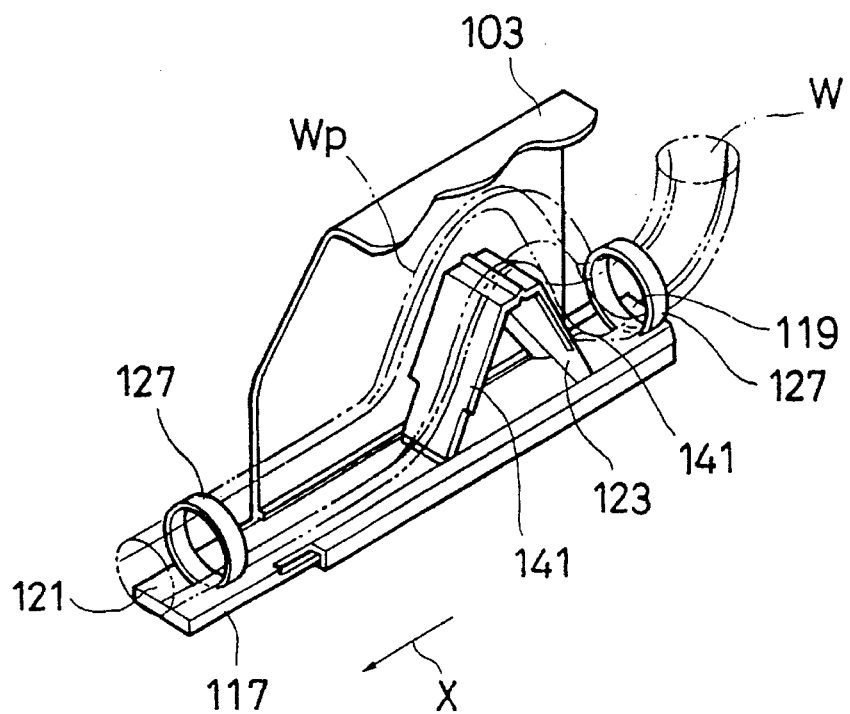
Figure 21B:
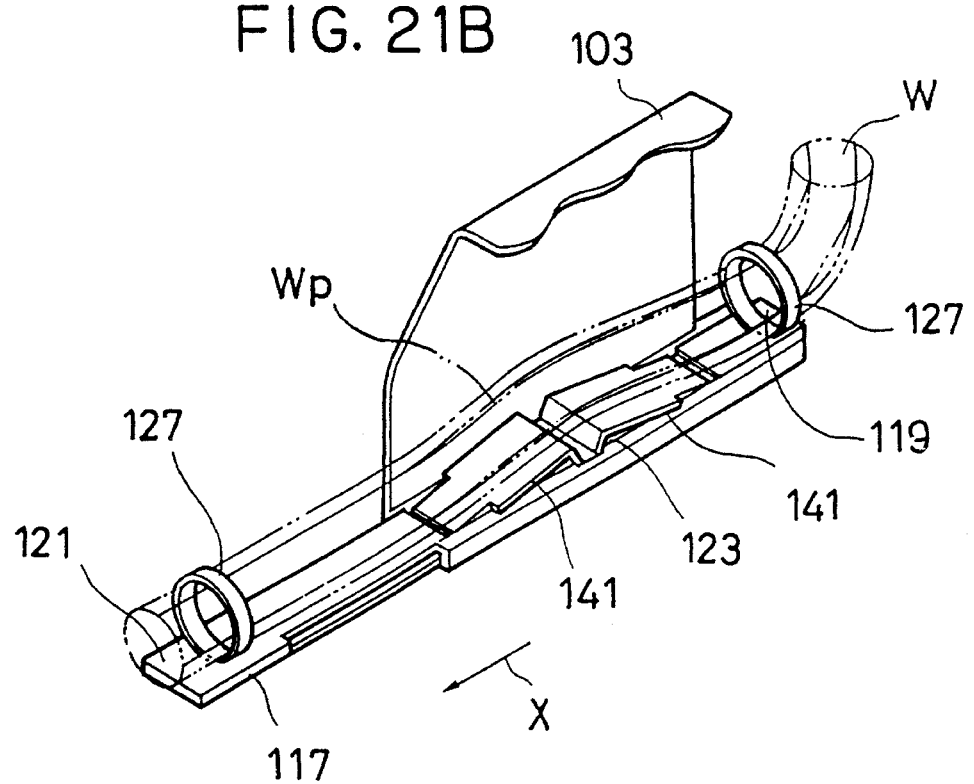

In the above-mentioned guide device, when the other end of the wire harness W is pulled in the direction of X thereby to expand as shown in FIG. 21A, the "slacken," or reserve part Wp extends straight and correspondingly, the band plate 117 is pressed downwardly to support the wire harness W thereon, urging it for its original position. On the other hand, when the force exerted on the wire harness W is released, the bending part 123 recovers to the original configuration of a mountain and thus urging the slacken part Wp to reappear to the original curved configuration shown in FIG. 21B.

According to this embodiment, since the wire harness W is positively urged beforehand, even when the expanding and contracting operations are applied on the harness W, neither an unexpected and unreasonable stress nor an idleness is not produced thereon, whereby the generation of noise can be avoided. Further, due to its simple structure, the miniaturization of the device can be promoted. Also in this embodiment, even if the band plate 117 has a plastical deformation a little, it is certainly that the wire harness W can be occupy the original position from its expanded condition.

Furthermore, due to the construction consisted by one protector 103 and the band plate 117, it is possible to reduce the number of constituents in comparison with those of the afore-mentioned fourth, fifth, sixth and seventh embodiments. Correspondingly, due to few constituents, there is contained few frictional areas and the frictional resistance of the device is low. Accordingly, it can be obtained smooth movements of the device in the expanding and contracting operations of the wire harness W. Again, due to its simple structure, it is possible to reduce the weight and manufacturing cost of the device.

As mentioned above, according to the present invention, with the arrangement of the slacken part in the wire harness and the means for urging the slacken part to return its original configuration when the shrunk part is expanded, it is possible to reduce the stress onto the harness produced by its expanding and contracting operations thereby to decrease the noise derived therefrom. Further, due to its simple structure, the miniaturization of the device can be effected.

What is claimed is:

1. A device for guiding a wire harness connected to a steering column, comprising:

a protector for accommodating a part of said wire harness therein to protect said part from an outside hazard, said part being provided with a a reserve part; and urging means for urging said reserve part to return to an original configuration thereof when said reserve part is expanded, and wherein said urging means are provided inside said protector.

2. The device of claim 1, wherein said protector comprises an outer protecting member and an inner protecting member constructed to be inserted into said outer protecting member and wherein one side of said reserve part is connected with said outer protecting member and another side of said reserve part is connected with said inner protecting member, and said urging means have one end connected with said outer protecting member and another end connected with said inner protecting member thereby to connect said outer protecting member with said inner protecting member.

3. The device of claim 1, wherein said urging means have one end to which one side of said reserve part is connected and which is engaged with said protector, and another end to which another side of said reserve part is connected and which is slidably engaged with said protector.

4. In a steering column, the combination of:

a wire harness connected to said steering column; and a protector for accommodating a part of said wire harness therein to protect said part from an outside hazard, said part being provided with a reserve part;

said reserve part comprising urging means for urging said reserve part to return to an original configuration thereof when said reserve part is expanded; and wherein said reserve part has a nature to return to a spiral form of a constant diameter in a free state.

5. A device for guiding a wire harness connected to a steering column, comprising:

a protector for accommodating a part of said wire harness therein to protect said part from an outside hazard, said part being provided with a reserve part; and urging means for urging said reserve part to return to an original configuration thereof when said reserve part is expanded, wherein said urging means are provided inside said protector, and wherein said urging means comprise two half-cylindrical ribs arranged in said protector.

6. A device for guiding a wire harness connected to a steering column, comprising:

a protector for accommodating a part of said wire harness therein to protect said part from an outside hazard, said part being provided with a reserve part; and urging means for urging said reserve part to return to an original configuration thereof when said reserve part is expanded, wherein said urging means are provided inside said protector, and wherein said urging means comprise a plurality of flexible ribs which are arranged apart from each other and each of which ribs are shorter than a width between opposed side walls of said protector.

7. A wire harness protective enclosure, comprising:

an elongated housing having an axis and facing channels formed in facing side walls of the housing; and means for deviating the wire harness perpendicular to the axis inside the housing, wherein the deviating means further comprises:

an elongated member having a distal end member portion adapted for entry into the enclosure along the facing channels inside the housing, a two-piece, centrally hinged section flexibly joined to the distal end member, an elongated proximal end member flexibly joined to the hinged section, adapted for entry into the channels behind the distal end member, and first means for securing a portion of the wire harness to the distal end member and second means for securing an elongated portion of the wire harness to the proximal end member.

8. A wire harness protective enclosure, comprising:

elongated first and second half-cylinders flexibly joined along one side common to both. the half-cylinders;

means for releasably joining each unjoined side of the first and second half-cylinder together to form a closed cylinder having a first axis along the length thereof; and means for attaching respective ends of a longitudinal section of the wire harness at respective opposing ends of the cylinder, wherein an elongated portion of the wire harness is coiled inside the cylinder.

9. The enclosure of claim 8, wherein the elongated portion is self-coiling.

10. The enclosure of claim 8, wherein the elongated portion is coiled in a helix.

11. A device for guiding a wire harness connected to a steering column, comprising:

a protector for accommodating a part of said wire harness therein to protect said part from an outside hazard, said part being provided with a reserve part; and urging means for urging said reserve part to return to an original configuration thereof when said reserve part is expanded, wherein said urging means are provided inside said protector, and wherein said urging means comprise an elastic plate member.

12. A wire harness protective enclosure, comprising:

a floor extending in a first direction;

at least one peripheral wall upstanding from the floor;

entry and exit wire harness accommodating apertures through the at least one peripheral wall at opposite ends of the floor and extending in the first direction, a cover enclosing the floor and the peripheral wall to complete the enclosure; and a deviating member disposed to resiliently deviate a portion of the wire harness inside the enclosure such that lengthening of the wire harness along the first direction is accommodated when tensioned external of the enclosure and shortening of the wire harness is accommodated when untensioned.

13. The enclosure of claim 12, wherein the deviating member comprises at least one internal wall upstanding from the floor, and wherein the internal wall is adapted to flex in a second direction generally normal to the first direction such that shortening of the wire harness is accommodated inside the enclosure by the deviating member when untensioned.

14. The enclosure of claim 13, wherein the internal wall is generally cylindrical and formed of half-cylinders, each coupled to the floor at a center of an arc formed by an end of the respective half-cylinder, and adapted to flex in a second direction such that shortening of the wire harness is accommodated inside the enclosure by the deviating member when untensioned.

15. The enclosure of claim 12, wherein the means for deviating further includes a plurality of internal walls extending perpendicular to the floor and attached perpendicularly to the peripheral wall, adapted to flex in a second direction such that shortening of the wire harness is accommodated inside the enclosure by the deviating member when untensioned.

16. A wire harness protective enclosure, comprising a first housing slidably disposed inside a second housing along a longitudinal axis common to the first and second housings, and means for attaching respective ends of a longitudinal section of the wire harness at respective opposing ends of the first and second housings, wherein an elongated portion of the wire harness is stored inside at least one of the housings, and means for releasably retracting the elongated portion inside the housing.

17. The enclosure of claim 16, wherein the elongated portion is coiled in a helix having a second longitudinal axis parallel to the first axis.

18. The enclosure of claim 16, wherein the elongated portion is coiled in a plurality of loops disposed along the axis.

19. The enclosure of claim 16, wherein the housings are rectilinear in cross section.

20. The enclosure of claim 16, wherein the housings are cylindrical in cross section.

21. The enclosure of claim 16, further including means for deviating the wire harness perpendicular to the axis when the housings are joined together, comprising a flexible member attached at a first end thereof inside the first housing and attached at a second end thereof inside the second housing.

22. The enclosure of claim 16, wherein the retracting means is a self-coiling elongated portion of the wire harness.

\* \* \* \* \*